United States Patent
Qiu

(10) Patent No.: US 12,058,982 B2
(45) Date of Patent: Aug. 13, 2024

(54) TIMED CALLING TYPE PET FEEDER CAPABLE OF PREVENTING MISTAKEN TOUCH

(71) Applicant: JIANGSU ZHONGHENG PET ARTICLES JOINT-STOCK CO., LTD., Suzhou (CN)

(72) Inventor: Bin Qiu, Suzhou (CN)

(73) Assignee: JIANGSU ZHONGHENG PET ARTICLES JOINT-STOCK CO., LTD., Jiangsu (CN)

( * ) Notice: Subject to any disclaimer, the term of this patent is extended or adjusted under 35 U.S.C. 154(b) by 184 days.

(21) Appl. No.: 17/830,299

(22) Filed: Jun. 1, 2022

(65) Prior Publication Data

US 2023/0389516 A1 Dec. 7, 2023

(51) Int. Cl.
*A01K 5/02* (2006.01)
(52) U.S. Cl.
CPC .................................. *A01K 5/0291* (2013.01)
(58) Field of Classification Search
CPC .. A01K 5/0291; A01K 5/0275; A01K 5/0283; A01K 7/02
See application file for complete search history.

(56) References Cited

U.S. PATENT DOCUMENTS

| | | | | |
|---|---|---|---|---|
| 5,226,539 A | * | 7/1993 | Cheng ................ | B65D 83/0454 206/534 |
| 8,061,300 B2 | * | 11/2011 | McElroy, Jr. ........ | A01K 1/0135 119/164 |
| 11,617,347 B2 | * | 4/2023 | Brackett .............. | A01K 15/024 119/51.02 |
| 2008/0289580 A1 | * | 11/2008 | Krishnamurthy .... | A01K 5/0291 119/51.11 |
| 2024/0081283 A1 | * | 3/2024 | Franklin .................. | A01K 5/02 |

FOREIGN PATENT DOCUMENTS

| | | | | |
|---|---|---|---|---|
| CN | 213784756 | | 7/2021 | |
| WO | WO-2011110822 A2 | * | 9/2011 | ........... A01K 5/0291 |

* cited by examiner

*Primary Examiner* — Ebony E Evans
(74) *Attorney, Agent, or Firm* — JCIPRNET

(57) ABSTRACT

A timed calling type pet feeder capable of preventing mistaken touch includes a bottom shell. A feeding tray matching with the bottom shell and embedded in the bottom shell is arranged on the bottom shell. N food storage boxes are uniformly arranged on the feeding tray along a circumferential direction in a sunken manner. The N is a positive integer greater than or equal to 3. A sealing cover configured to seal N−1 food storage boxes is arranged on the bottom shell. A rotating mechanism configured to drive the sealing cover to rotate, a control module configured to drive the rotating mechanism to operate, and an appetite stimulating module configured to cooperate with the control module to implement interaction are arranged in a center of the bottom shell. The control module includes a printed circuit board (PCB). The PCB is programmed with a timing module, a key module, and a display module. The appetite stimulating module includes a recording module configured to record a sound for urging a pet to eat and a speaker configured for timed playback of the sound.

8 Claims, 5 Drawing Sheets

TIMED CALLING TYPE PET FEEDER CAPABLE OF PREVENTING MISTAKEN TOUCH

BACKGROUND

Technical Field

The present disclosure relates to the field of pet feeders, and specifically to a timed calling type pet feeder capable of preventing mistaken touch.

Description of Related Art

With the general improvement of living conditions, more and more people like to keep pets, and pets, as friends of human beings, also greatly improve people's quality of life. However, many people cannot be with their pets all the time due to work reasons, and often have to leave pets alone at home. In such cases, people cannot feed pets in time by themselves. Therefore, at present, people generally use pet feeders to feed pets. The design of existing pet feeders is relatively simple, and the main functions include automatic feeding of pets, that is, the user can set the pet feeder to automatically open the food box according to the set time, so as to realize automatic feeding without manual intervention.

However, the existing design schemes have many problems. For example, although the existing pet feeder is automatically opened according to the set time, the amount of food distributed each time cannot be controlled, and most of the existing pet feeders distribute a large amount of food at a time for pets to eat. Automatic pet feeders are a type of pet product that is gradually becoming popular, and mainly serve for two purposes. One of the purposes is to feed pets with an accurate amount of food in order to ensure the health of pets. However, if a feeder is equipped with only one food container such as a measuring cup, the operation is relatively cumbersome because the food container can be loaded with food for only one meal each time. This problem can be well solved by a feeder with multiple food compartments, which can be loaded with food for multiple meals at a time. The other purpose is to avoid starvation of pets during absence of the breeder, so it is necessary to load food for several days at a time, which also requires the use of a feeder with multiple food compartments.

However, although existing pet feeding boxes include multiple feeding boxes, the opening of the automatic feeder alone sometimes cannot urge pets who are younger, have strong dependence, or are in a pathological stage, to eat on time. In addition, all the keys on the control panel are exposed, and are likely to be triggered unintentionally by pets, resulting in unexpected shutdown and consequent failure in providing pets with food in time. The position of the operation interface is unreasonable, which is inconvenient for operation and violates the basic principle of ergonomics. The man-machine interaction interface of the product is relatively complex and not convenient enough.

Based on the technical problems and market demands in this field, there is an urgent need for a multi-functional automatic feeder that can realize interaction between humans and pets, stimulate pets' appetite, and cultivate pets' good eating habits.

SUMMARY

To overcome the drawbacks in the prior art, an objective of the present disclosure is to provide a timed calling type pet feeder capable of preventing mistaken touch, which has the advantages of realizing interaction between humans and pets, stimulating pets' appetite, and cultivating pets' good eating habits.

The objective of the present disclosure is achieved through the following technical solutions. A timed calling type pet feeder capable of preventing mistaken touch is provided. The pet feeder includes a bottom shell. A feeding tray matching with the bottom shell and embedded in the bottom shell is arranged on the bottom shell. N food storage boxes are uniformly arranged on the feeding tray along a circumferential direction in a sunken manner. N is a positive integer greater than or equal to 3. A sealing cover configured to seal N−1 food storage boxes is arranged on the bottom shell. A rotating mechanism configured to drive the sealing cover to rotate, a control module configured to drive the rotating mechanism to operate, and an appetite stimulating module configured to cooperate with the control module to implement interaction are arranged in a center of the bottom shell.

The rotating mechanism includes a rotary casing, a driving motor, and a gear set fixedly connected to an output shaft of the driving motor. Internal teeth are arranged on one side of the rotary casing close to the gear set. The gear set is meshed with the internal teeth through multiple decelerations.

The control module includes a printed circuit board (PCB). The PCB is programmed with a timing module, a key module, and a display module.

The appetite stimulating module includes a recording module configured to record a sound for urging a pet to eat and a speaker configured for timed playback of the sound.

By adopting the above technical solution, the N food storage boxes arranged on the feeding tray allow the breeder to place food for multiple meals. According to the setting of the timing module of the control module, the driving motor of the rotating mechanism can be driven to rotate in a timed manner. The rotation of the driving motor drives the worm gear to rotate, and the worm gear then drives the first intermediate gear to rotate. After the speed reduction by a plurality of gears with different sizes, the internal teeth are driven to rotate, thereby driving the rotary casing to rotate. Then the rotary casing drives the sealing cover connected thereto to rotate, so as to expose different food storage boxes in a timed manner to feed pets.

The key module and the display module can visually display the timing, recording and other keys and statuses. The structure is simple and convenient to operate. The appetite stimulating module can be used to record a pet's favorite sound or the breeder's voice calling the pet to play or eat, to attract the pet to the food storage box and stimulate its desire to eat. The appetite stimulating module may be used in combination with timed feeding of food to cultivate good eating habits for pets, or to realize timed feeding of medicaments to pets.

The present disclosure is further configured as follows: the gear set includes a worm gear fixedly connected to the output shaft of the driving motor and a first intermediate gear meshed with the worm gear, the first intermediate gear is coaxially connected to a second intermediate gear configured for deceleration, the second intermediate gear is meshed with a first clutch gear close to the rotary casing, the first clutch gear is coaxially connected to a second clutch gear configured for further deceleration, a normally compressed spring is sleeved over a shaft of the second clutch gear, and the second clutch gear is meshed with the internal teeth.

By adopting the above technical solution, a top of the spring presses against a bottom surface of a motor fixing member, and the second clutch gear is meshed with the internal teeth. When a pet or heavy object presses on an upper part of the sealing cover, the gear set cannot operate normally, and the motor may idle. With the additional provision of the first clutch gear and the second clutch gear, when a large pressure is exerted on the upper part, the first clutch gear is detached from the second clutch gear, stalls and rotates slowly, and restores its fixed position under an elastic force of the spring, thereby preventing the motor from idling, and further optimizing the structure and prolonging the service life of the product.

The present disclosure is further configured as follows: a sterilization module configured to sterilize food in the feeding tray is arranged on the feeding tray, and the sterilization module is electrically connected to the control module.

By adopting the above technical solution, the sterilization module is powered on or off under the control of the control module, and can sterilize the food in the feeding tray at regular intervals. The sterilization module faces toward the feeding tray and sterilizes the contents of the feeding tray by irradiation, to greatly inhibit the growth of food anaerobic bacteria due to the closed environment and temperature and maintain the freshness of the food, thereby increasing the food safety for pets, and further optimizing the structure.

The present disclosure is further configured as follows: the key module is configured to perform, according to a key self-locking function programmed on the PCB, a key self-locking operation after the automatic feeder is not operated for a period of time.

By adopting the above technical solution, after the breeder finishes setting, key self-locking is performed according to a programmed program, to prevent mistaken touch by pets, and further optimize the structure.

The present disclosure is further configured as follows: the key module further includes a manual feeding key configured to send a rotation command to the control module, so that the control module instantly drives the rotating mechanism to rotate for feeding.

By adopting the above technical solution, when the breeder is at home or needs to manually feed the pet immediately, the breeder can instantly feed the pet through the manual feeding key, which increases the applicability and flexibility of the product.

The present disclosure is further configured as follows: the rotary casing is detachably connected to the sealing cover, the sealing cover is provided with two self-locking devices along a diameter direction of the feeding tray, the self-locking devices include two push buttons located on the sealing cover, limiting grooves are formed through the rotary casing, and the limiting grooves are respectively configured for the push buttons to be horizontally embedded and slide therein.

By adopting the above technical solution, to allow the breeder to conveniently load food in the food storage boxes, the sealing cover can be removed easily by unlocking the self-locking devices, and then food can be put into the food storage boxes. The sealing cover can be opened only when the two self-locking devices respectively arranged on two sides are unlocked at the same time, so as to prevent the sealing cover from being opened by mistaken touch by the pet's paws to cause overeating.

The present disclosure is further configured as follows: a plurality of resistance reducing members are arranged on an edge of a bottom surface of the sealing cover, each of the resistance reducing members is provided with hemispherical grooves, and each of the hemispherical grooves is configured for a ball to be embedded and rotate therein.

By adopting the above technical solution, the resistance reducing members are changed from sliding to rolling, which further reduces friction and improves the rotational smoothness of the sealing cover.

The present disclosure is further configured as follows: a receiving groove for horizontal embedding and sliding of each of the push buttons is arranged at the position of each of the self-locking devices on the sealing cover, and a top of each of the push buttons is provided with an anti-skid texture.

If the push buttons are arranged as protruding from the sealing cover, it is very likely for pets to touch. By adopting the above technical solution, the push buttons arranged in recesses further prevent touching by pets and further optimize the structure.

The present disclosure is further configured as follows: a locking indicating protrusion is arranged on one side of each of the push buttons.

By adopting the above technical solution, the breeder can be prompted of opening or closing of the sealing cover, which further optimizes the structure.

In conclusion, the present disclosure has the following beneficial effects. The present disclosure not only supports automatic regular and quantitative feeding through the multiple food storage boxes, but also supports manual feeding through the manual feeding key. The present disclosure can play a feeding reminder sound, and can use the recording function to customize the sound to be played to stimulate the pets' appetite. The key self-locking function prevents cats and dogs from accidentally triggering the pet feeder. The sterilization module is powered on or off under the control of the control module, and can sterilize the food in the feeding tray at regular intervals, to inhibit the growth of food anaerobic bacteria and maintain the freshness of the food, thereby increasing the food safety for pets.

In the figures: 1. bottom shell; 2. feeding tray; 3. food storage box; 4. sealing cover; 5. rotary casing; 6. driving motor; 7. worm gear; 8. first intermediate gear; 9. internal teeth; 10. PCB; 11. push button; 12. limiting groove; 13. receiving groove; 14. anti-skid texture; 15. limiting switch; 16. second intermediate gear; 17. first clutch gear; 18. second clutch gear; 19. spring; 20. resistance reducing member; 21. ball; 22. speaker; 23. motor fixing member; 24. sterilization module; 25. key module.

DESCRIPTION OF THE EMBODIMENTS

Specific embodiments of the present disclosure are described in detail below in conjunction with the accompanying drawings.

Figure 1:
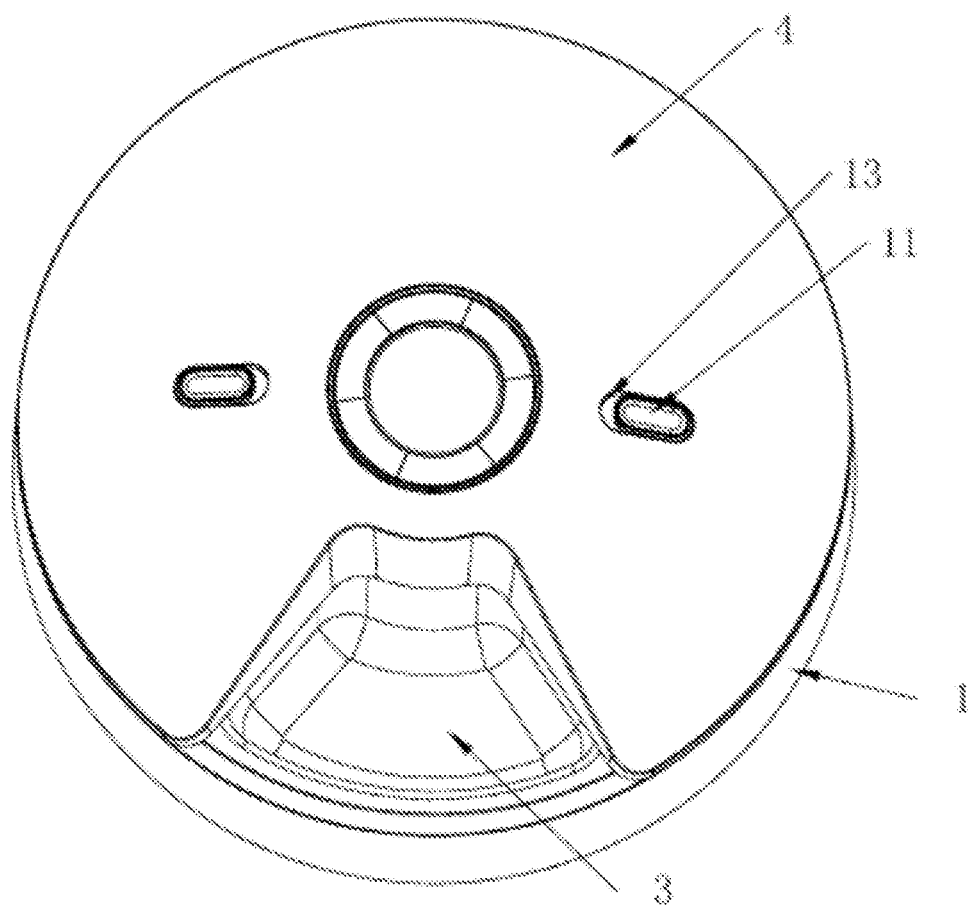
FIG. 1 is a schematic diagram of an overall structure of an embodiment.

Embodiment 1: As shown in FIG. 1, a timed calling type pet feeder capable of preventing mistaken touch includes a bottom shell 1. A feeding tray 2 matching with the bottom shell 1 and embedded in the bottom shell 1 is arranged on the bottom shell 1. N food storage boxes 3 are uniformly arranged on the feeding tray 1 along a circumferential direction in a sunken manner. N is a positive integer greater than or equal to 3. A sealing cover 4 configured to seal N−1 food storage boxes 3 is arranged on the bottom shell 1.

In this embodiment, N is set to 5, that is, there are five food storage boxes 3. A rotating mechanism configured to drive the sealing cover 4 to rotate, a control module configured to drive the rotating mechanism to operate, and an appetite stimulating module configured to cooperate with the control module to implement interaction are arranged in a center of the bottom shell 1.

Figure 3:
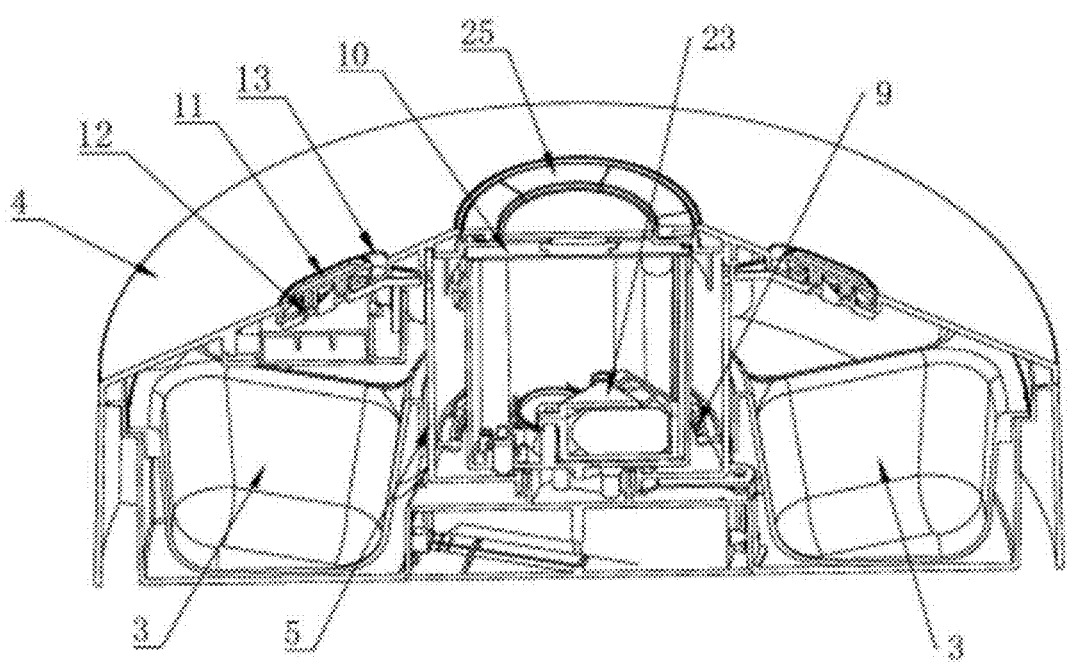
FIG. 3 is a schematic diagram illustrating a self-locking mechanism according to an embodiment.
Figure 4:
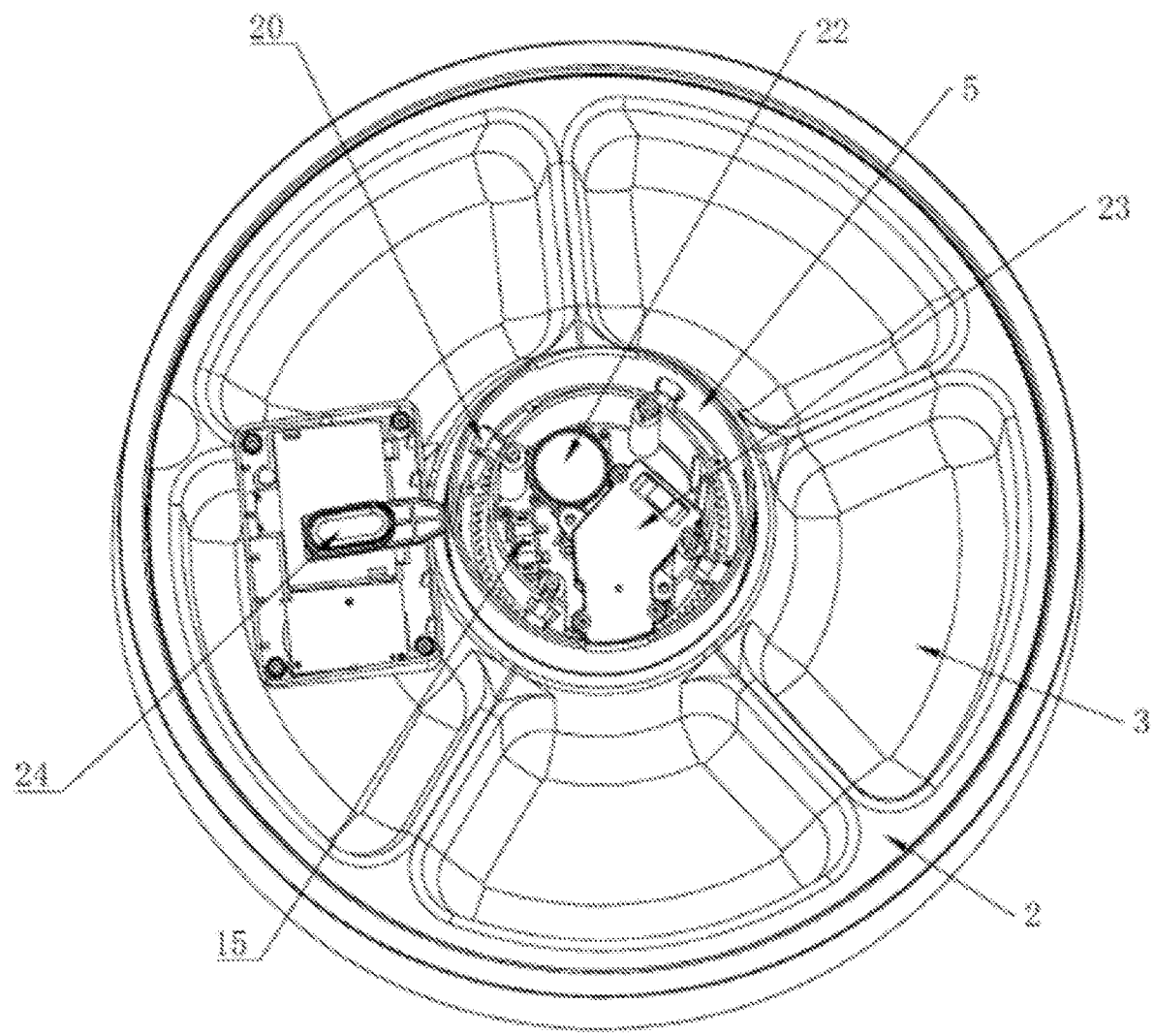
FIG. 4 is a schematic structural diagram illustrating interior of a bottom shell according to an embodiment.
Figure 5:
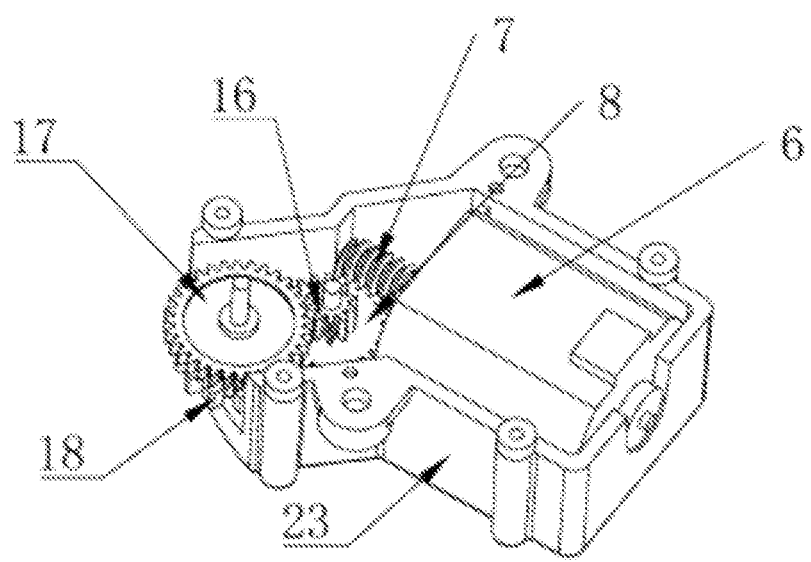
FIG. 5 is a schematic structural diagram of a gear set according to an embodiment.

As shown in FIG. 3 and FIG. 4, the rotating mechanism includes a rotary casing 5, a driving motor 6, a worm gear 7 fixedly connected to an output shaft of the driving motor 6, and a first intermediate gear 8 meshed with the worm gear 7. The first intermediate gear 8 is coaxially connected to a second intermediate gear 16 configured for deceleration. The second intermediate gear 16 is meshed with a first clutch gear 17 close to the rotary casing. The first clutch gear 17 is coaxially connected to a second clutch gear 18 configured for further deceleration. The first clutch gear 17 is coaxially connected to the second clutch gear 18 configured for further deceleration. Internal teeth 9 are arranged on one side of the rotary casing 5 close to the gear set 18. A normally compressed spring 19 is sleeved over a shaft of the second clutch gear 18. The rotating mechanism includes a motor fixing member 23 outside the gear set. A top of the spring 19 is in contact with a bottom surface of the motor fixing member 23. The second clutch gear 18 is meshed with the internal teeth 9. When a pet or heavy object presses on an upper part of the sealing cover 4, the gear set cannot operate normally, and the driving motor 16 may idle. With the additional provision of the first clutch gear 17 and the second clutch gear 18, when a large pressure is exerted on the upper part, the first clutch gear 17 is detached from the second clutch gear 18, stalls and rotates slowly, and restores its fixed position under an elastic force of the spring 19, thereby preventing the driving motor 16 from idling, and further optimizing the structure and prolonging the service life of the product.

As shown in FIG. 4, the N food storage boxes arranged on the feeding tray 2 allow the breeder to place food for multiple meals. According to the setting of the timing module of the control module, the driving motor 6 of the rotating mechanism can be driven to rotate in a timed manner. The rotation of the driving motor 6 drives the worm gear 7 to rotate, and the worm gear 7 then drives the first intermediate gear 8 to rotate. After the speed reduction by a plurality of gears with different sizes, the internal teeth 9 are driven to rotate, thereby driving the rotary casing 5 to rotate. Then the rotary casing 5 drives the sealing cover 4 connected thereto to rotate, so as to expose different food storage boxes 3 in a timed manner. The rotation of the food storage boxes are precisely controlled by a limiting switch 15 to feed pets.

Figure 2:
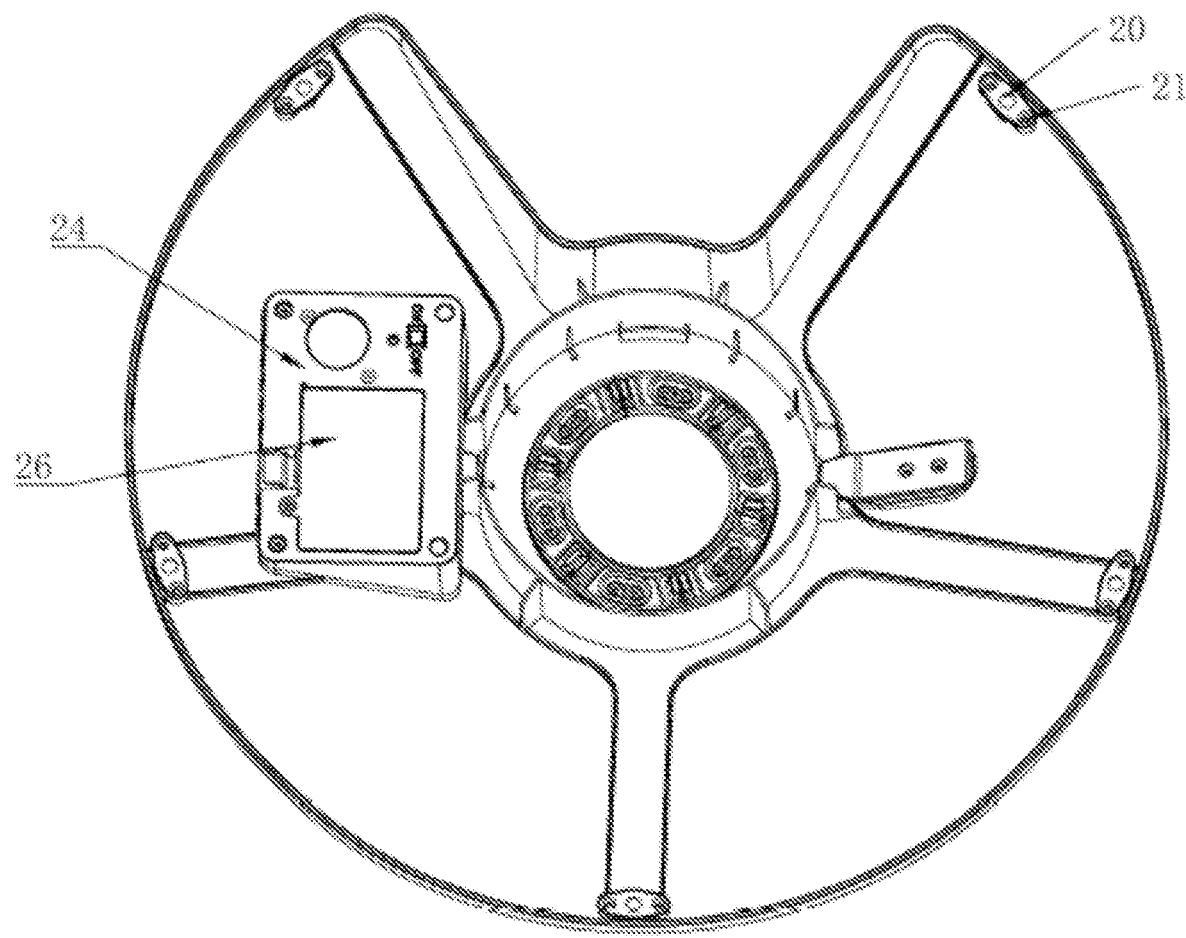
FIG. 2 is a schematic diagram illustrating a driving mechanism according to an embodiment.

As shown in FIG. 2, the rotary casing 5 is detachably connected to the sealing cover 4. A plurality of resistance reducing members 20 are arranged on an edge of a bottom surface of the sealing cover 4. Each of the resistance reducing members 20 is provided with hemispherical grooves. Each of the hemispherical grooves is configured for a ball 21 to be embedded and rotate therein. The resistance reducing members 20 are changed from sliding to rolling, which further reduces friction and improves the rotational smoothness of the sealing cover 4. The sealing cover 4 is provided with two self-locking devices along a diameter direction of the feeding tray 2. The self-locking devices include two push buttons 11 located on the sealing cover 4. Limiting grooves 12 are formed through the rotary casing 5. The limiting grooves 12 are respectively configured for the push buttons 11 to be horizontally embedded and slide therein. To allow the breeder to conveniently load food in the food storage boxes 3, the sealing cover 4 can be removed easily by unlocking the self-locking devices, and then food can be put into the food storage boxes. The sealing cover 4 can be opened only when the two self-locking devices respectively arranged on two sides are unlocked at the same time, so as to prevent the sealing cover 4 from being opened by mistaken touch by the pet's paws to cause overeating. A receiving groove 13 for horizontal embedding and sliding of each of the push buttons 11 is arranged at the position of each of the self-locking devices on the sealing cover 4. A top of each of the push buttons 11 is provided with an anti-skid texture 14. A locking indicating protrusion is arranged on one side of each of the push buttons. If the push buttons 11 are arranged as protruding from the sealing cover 4, it is very likely for pets to touch. The push buttons 11 arranged in recesses further prevent touching by pets and further optimize the structure.

As shown in FIG. 3 and FIG. 4, the control module includes a PCB 10. The PCB 10 is programmed with a timing module, a key module 25, and a display module. The key module 25 and the display module can visually display the timing, recording and other keys and statuses. The structure is simple and convenient to operate. The appetite stimulating module can be used to record a pet's favorite sound or the breeder's voice calling the pet to play or eat, and includes a speaker 22 configured to attract the pet to the food storage box 3 and stimulate its desire to eat. The appetite stimulating module may be used in combination with timed feeding of food to cultivate good eating habits for pets, or to realize timed feeding of medicaments to pets. The key module 25 is configured to perform, according to a key self-locking function programmed on the PCB 10, a key self-locking operation after the automatic feeder is not operated for a period of time. After the breeder finishes setting, key self-locking is performed according to a programmed program, to prevent mistaken touch by pets, and further optimize the structure. The key module 25 further includes a manual feeding key configured to send a rotation command to the control module, so that the control module instantly drives the rotating mechanism to rotate for feeding. When the breeder is at home or needs to manually feed the pet immediately, the breeder can instantly feed the pet through the manual feeding key, which increases the applicability and flexibility of the product. The appetite stimulating module includes a recording module configured to record a sound for urging a pet to eat and the speaker configured for timed playback of the sound. When the battery level is low, the display module may display an empty battery icon on a screen to remind the user to replace the battery, and intuitively display an operation interface.

As shown in FIG. 3, a sterilization module 24 configured to sterilize food in the feeding tray is further arranged on the feeding tray 2. The sterilization module 24 is located on a side surface of the feeding tray 2 in this embodiment. In practical applications, the sterilization module 24 may also be located at other positions such as a top, middle, or bottom of the feeding tray 2. The sterilization module 24 faces toward the feeding tray 2. The sterilization module 24 is electrically connected to the control module. The sterilization module 24 is powered on or off under the control of the control module, and can sterilize the food in the feeding tray 2 at regular intervals. The sterilization module 24 sterilizes the contents of the feeding tray by irradiation, to greatly inhibit the growth of food anaerobic bacteria due to the closed environment and temperature and maintain the freshness of the food, thereby increasing the food safety for pets, and further optimizing the structure.

The above descriptions are merely example embodiments of the present disclosure. It should be appreciated that for those of ordinary skill in the art, several variations and improvements can be made without departing from the concept of the present disclosure, which are all regarded as falling within the protection scope of the present disclosure.

What is claimed is:

1. A timed calling type pet feeder capable of preventing mistaken touch, comprising a bottom shell, wherein a feeding tray is arranged on the bottom shell, N food storage boxes are uniformly arranged on the feeding tray along a circumferential direction in a sunken manner, the N is a positive integer greater than or equal to 3, a sealing cover configured to seal N−1 food storage boxes of the N food storage boxes is arranged on the bottom shell, and a rotating mechanism configured to drive the sealing cover to rotate, a control module configured to drive the rotating mechanism to operate, and an appetite stimulating module configured to cooperate with the control module to implement interaction are arranged in a center of the bottom shell;

the rotating mechanism comprises a rotary casing, a driving motor, and a gear set fixedly connected to an output shaft of the driving motor, internal teeth are arranged on one side of the rotary casing close to the gear set, and the gear set is meshed with the internal teeth through multiple decelerations;

the control module comprises a printed circuit board; and the appetite stimulating module comprises a recording module configured to record a sound for urging a pet to eat and a speaker configured for timed playback of the sound.

2. The timed calling type pet feeder capable of preventing mistaken touch according to claim 1, wherein the gear set comprises a worm gear fixedly connected to the output shaft of the driving motor and a first intermediate gear meshed with the worm gear, the first intermediate gear is coaxially connected to a second intermediate gear configured for deceleration, the second intermediate gear is meshed with a first clutch gear close to the rotary casing, the first clutch gear is coaxially connected to a second clutch gear configured for further deceleration, and the second clutch gear is meshed with the internal teeth.

3. The timed calling type pet feeder capable of preventing mistaken touch according to claim 1, wherein a sterilization module configured to sterilize food in the feeding tray is arranged on the feeding tray, and the sterilization module is electrically connected to the control module.

4. The timed calling type pet feeder capable of preventing mistaken touch according to claim 1, wherein the key module is configured to perform, according to a key self-locking function programmed on the printed circuit board, a key self-locking operation after the pet feeder is not operated for a period of time.

5. The timed calling type pet feeder capable of preventing mistaken touch according to claim 1, wherein the rotary casing is detachably connected to the sealing cover, the sealing cover is provided with two self-locking devices along a diameter direction of the feeding tray, the self-locking devices comprise two push buttons located on the sealing cover, limiting grooves are formed through the rotary casing, and the limiting grooves are respectively configured for the push buttons to be horizontally embedded and slide in the limiting grooves.

6. The timed calling type pet feeder capable of preventing mistaken touch according to claim 5, wherein a plurality of resistance reducing members are arranged on an edge of a bottom surface of the sealing cover, each of the resistance reducing members is provided with hemispherical grooves, and each of the hemispherical grooves is configured for a ball to be embedded and rotate in the each of the hemispherical grooves.

7. The timed calling type pet feeder capable of preventing mistaken touch according to claim 5, wherein a receiving groove for horizontal embedding and sliding of each of the push buttons is arranged at a position of each of the self-locking devices on the sealing cover, and a top of each of the push buttons is provided with an anti-skid texture.

8. The timed calling type pet feeder capable of preventing mistaken touch according to claim 6, wherein a locking indicating protrusion is arranged on one side of each of the push buttons.

* * * * *